United States Patent [19]

Lao

[11] Patent Number: 4,468,115
[45] Date of Patent: Aug. 28, 1984

[54] TRAVELLING LAMP HOUSE FOR 3-D PHOTOGRAPHIC PRINTER

[75] Inventor: Kenneth Q. H. Lao, Atlanta, Ga.

[73] Assignee: Nimslo International Limited, Hamilton, Bermuda

[21] Appl. No.: 382,197

[22] Filed: May 26, 1982

[51] Int. Cl.³ .................. G03B 27/32; G03B 35/14
[52] U.S. Cl. ...................................... 355/22; 354/112
[58] Field of Search ............................ 355/22, 77; 354/112–115; 350/130; 353/7

[56] References Cited

U.S. PATENT DOCUMENTS 3,953,869  4/1976  Wah Lo et al. ............... 354/115
4,120,562 10/1978  Lo et al. ..................... 355/22 X

Primary Examiner—Richard A. Wintercorn
Attorney, Agent, or Firm—Brumbaugh, Graves, Donohue & Raymond

[57] ABSTRACT

In a processor for producing autostereoscopic pictures on lenticular print film, a film strip carrier sequentially positions frames of a negative film strip series in front of a projecting and enlarging lens. A lamp housing provides a light source through a light cone for exposing each negative onto the film, and a stepping motor moves the lens and negative to scan a predetermined segment below each lenticule, and stops the lens when the next negative is to be advanced into the light gate. A driving motor is coupled to the lamp housing, and the speed of the motor and width of the light cone are determined as a function of the operating characteristics of the processor such that the lamp housing moves without stopping during the entire projecting cycle and the cone width is the minimum necessary to permit such continuous movement.

9 Claims, 3 Drawing Figures

TRAVELLING LAMP HOUSE FOR 3-D PHOTOGRAPHIC PRINTER

BACKGROUND OF THE INVENTION

The present invention relates to an improvement in a single lens enlarger for producing autostereoscopic pictures on a lenticular print film.

In producing a three-dimensional print, a series of photographs are taken of the subject field from differing angles of view. The negatives in the series are printed on film covered with a lenticular screen to form lineiform images of the subject. The exposed film is developed and covered with a lenticular viewing screen such that from any given viewing angle the screen projects, through the lenslets, a composite image of only one of the negatives. Since the eyes of a person viewing the screen are disposed at two spaced viewing angles relative to the screen, the screen projects two different composite images to the eyes, corresponding to two different viewing angles of the subject field and thus produces a stereoscopic image.

To print the negatives in the series, the area beneath each lenticule is divided into a number of equal segments corresponding to the number of negatives in the series. The first negative in the series is aligned with a projecting lens such that the image, which is laterally condensed by the lenticules into a narrow band, falls upon and exposes the film only in the designated segment area below the lenticules of the lenticular screen. This process is repeated for each negative in the series to fill in the remainder of segments below each lenticule. Alternatively, a plurality of projecting lenses may be arranged such that all the negatives are projected simultaneously onto their respective segments below the lenslets.

Once the negatives have been printed on the photographic paper, a lenticular viewing screen is applied to the print. For any given viewing angle, the lenticules of the screen project and enlarge only a portion of the film below each lenticule, which may be a segment or less than a segment. The portion projected by each lenticule corresponds to the same photograph in the series such that the projected and enlarged portions form a continuous, composite photograph. When the screen is viewed from a different viewing angle, a different portion of the print below each lenticule, corresponding to a different photograph in the series (and thus a different viewing angle), is projected and enlarged to form another continuous, composite photograph. Accordingly, when the screen is viewed simultaneously from two different viewing angles, as occurs when a viewer looks at the screen through both eyes, different composite images, representative of two different angles of view of the subject field, are projected to each eye, and the print appears to be three-dimensional.

In three-dimensional printing processes, when each negative in the series is projected onto a segment of lenticular film, the focal width of the laterally condensed image is such that the projected image on the film does not occupy the entire segment, but takes up only a small part of the designated segment. In order to avoid gaps between segments, apparatus is provided for expanding the individual, projected, condensed lineiform images to fill in the remaining area of the designated segment, such that the images in the segments will be contiguous (but do not overlap). This is accomplished by "scanning" the projected image from each frame in a direction transverse to the longitudinal direction of the lenticules. The scanning movement may either be continuous or be intermittent.

Preferred methods and apparatus for carrying out the scanning process are disclosed in U.S. Pat. No. 3,953,869, the pertinent portions of which are hereby incorporated into the present application. As there disclosed, for each negative in the series, the negative is first positioned in front of the light gate so as to be aligned with the projecting lens. The lamp is turned on behind the negative, to project the negative image through the light gate and projecting lens onto the lenticular screen. Each lenslet of the screen condenses the image incident thereon into a narrow band and directs the band onto a portion of the unexposed film. The projecting lens is positioned such that the band falls within the pre-assigned segment. The film, light source and projecting lens are thereafter moved synchronously, either continuously or intermittently, to scan the film and fill in the remaining area of the segment.

Once the segment is filled, the light source is turned off by closing a shutter and is stopped, and the negative carrier is shifted to move the first negative in the series out of the light gate and position the second negative in the series in front of the light gate. The negative carrier is then adjusted to align the key subject matter of the second negative with that of the first. The light source is again turned on, and the light source, negative, and projecting lens are moved synchronously, either continuously or in steps, to scan the second segment below each lenticule. This process is repeated for the remaining negatives in the series until all the segments under each lenticule are filled.

The foregoing apparatus is advantageous in that a single lens projector may be employed, and the ability of the negative carrier to handle a series of attached negatives permits the machinery to be fully automated, including the feeding and withdrawal of film strips to and from the film strip carrier, and the feeding and withdrawal of lenticular film to and from the exposure station.

In the foregoing arrangement, while scanning each segment the light source is moved along with the travelling negative and lens to provide adequate exposure light intensity. The light source is mounted behind the negative which is positioned in front of the light gate, and is synchronously driven with the negative and projection lens housing during scanning. As described above, however, there are a number of stop and move periods in one complete printing cycle. Each time a segment has been scanned, the projecting lens, film carrier, and light source are stopped until the next negative is positioned in front of the light gate and the key subject area is aligned. Jerking due to rapid stop and start of the lamp housing increases the chance of reducing the lifetime of the projection lamp, and therefore is undesirable. Also, where the lamp and projection lens are contained in essentially a common housing, to move synchronously the mass of the housing that must be stopped and re-started for scanning is increased.

SUMMARY OF THE INVENTION

The present invention is an improvement in apparatus for producing three-dimensional print film from a series of negatives in which a lamp housing operates with a single projecting lens, but in which the lamp housing moves continuously to prevent jerking due to rapid stops and starts.

More particularly, a film processor in accordance with the present invention includes a projector housing supporting a projecting lens for enlarging and projecting a negative onto lenticular print film. A negative carrier is associated with the projector housing for positioning the negatives sequentially in front of a light gate. A lamp housing provides a light source for exposing the negatives in the series onto the unexposed film.

In order to provide scanning of each segment of the film, a first motor, for example a stepping motor, is coupled to the projector housing for moving both the housing and film carrier during the scanning operation for each negative. After the first segment is scanned, the stepping motor stops the projector housing and negative carrier and a second stepping motor, connected to the negative carrier, moves the negative carrier relative to the projector housing to move the first negative out of the light gate and to position the next negative in front of the light gate. The first stepping motor thereafter resumes the scanning operation, moving both the projector housing and the negative carrier, to fill in the second segment of the unexposed film below the lenticular screen. This operation is repeated for each negative in the series.

A driving motor having the characteristics described below is coupled to the lamp housing. The motor speed and light cone width are determined, based upon the operating characteristics of the film processor, such that the lamp house can move without stopping through the entire printing cycle of all the negatives in the series, and such that the light cone width is kept at a minimum while permitting continuous movement. A constant speed motor having such characteristics is coupled to the lamp housing to move the housing in the direction of scanning along with the projecting lens and negative, but at a slower speed than the first stepping motor moves the projector housing.

Since the speed of the lamp housing during scanning is less than the scanning speed of the projecting lens, the width of the light cone is greater than that of the light gate to assure that light cone covers the entire width of the light gate during scanning operation of each negative. But, as discussed above, to assure sufficient light intensity the lamp housing is driven at a speed selected to require the minimum width light cone. More specifically, the speed of the lamp house assembly and the width of the light cone are determined as a function of the distance and time each negative travels in scanning the print segment, the width of the light gate (negative), and the pause time required to move successive exposures into the light gate and perform key-subject alignment. As a result, the lamp house assembly moves at constant speed without stops and starts, and the light cone is assured of covering the entire light gate, but with a minimum of excess width so as to provide sufficient light intensity, through the entire printing cycle.

For a better understanding of the invention, reference is made to the following detailed description of a preferred embodiment, taken in conjunction with the drawings accompanying the application.

DETAILED DESCRIPTION OF A PREFERRED EMBODIMENT

Figure 1:
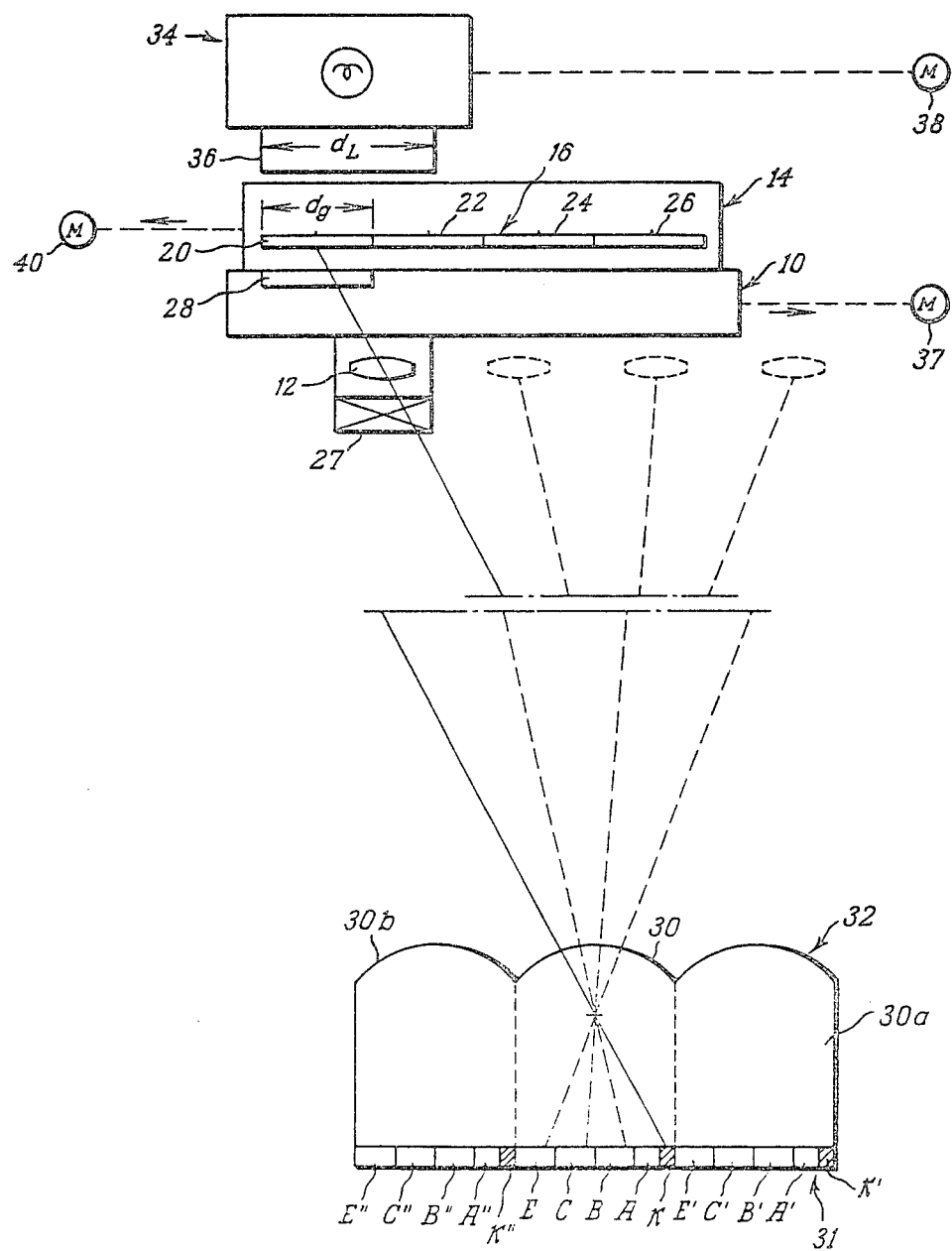
FIG. 1 portrays a representative single-lens composing system according to the invention.

FIG. 1 depicts a 3-D printer system at the start of the printing cycle. A projector housing 10 supports an enlarging lens 12 and a negative film strip carrier 14. The solid line image of the lens 12 represents the starting position of the lens, while the phantom line images represent the position of the lens during later stages of the printing cycle.

A film strip 16, which, by way of example has a series of four two-dimensional frames 20, 22, 24 and 26, is supported by the carrier 14 in any conventional fashion. The frames in the series, which represent views of the subject field taken at different viewing angles, may be taken simultaneously by a multi-lens camera, or may be taken successively from a single lens camera moved to a new viewing angle for each exposure. In the starting position shown in FIG. 1, the first negative 20 of the film strip series 16 is positioned by the negative carrier 14 in front of a light gate 28. The film strip 16 may be delivered to the film strip carrier 14, and the first negative 20 positioned in front of the light gate, using any conventional transport apparatus.

A lamp housing assembly 34 is positioned behind the negative 20 and light gate 28. The lamp house assembly 34 has a light cone 36 with a width $d_L$ which is selected as described below. As shown, however, the width $d_L$ of the light cone 36 is larger than the width of the negatives and width, $d_g$, of the corresponding light gate 28.

The image of the negative 20 is projected through the lens 12 and opened shutter 27 onto a piece of unexposed film 31. The shutter 27 is normally closed to block the light when the film 31 is not being exposed. The film 31 is covered by a lenticular screen 32, such that the portion of the image striking each lenticule, e.g. lenticule 30, 30a, 30b, is laterally compressed into a relatively small image band K, K' and K" respectively. In FIG. 1 the size of the film 31 and lenticular screen 32 is exaggerated for the purpose of illustrating the principles of the invention. In printing the four negatives 20, 22, 24 and 26, as shown in FIG. 1 the film 31 beneath each lenticule 30, 31a, 30b is divided into four segments, A, B, C and D, of equal size, for receiving images from the four negatives 20, 22, 24 and 26, respectively, in the film strip series 16. The focal width (or band width) of the laterally compressed image segment K, K' or K" beneath each lenticule is much narrower than the width of the segment, e.g. A, A', A". In order to fill up each entire segment, e.g. A, beneath the lenticule 30, each negative, e.g. 20, is scanned across the segment, in accordance with the teachings of U.S. Pat. No. 3,953,869.

As shown in FIG. 1, at the beginning of the composing step the film carrier 14 and projector housing 10 are positioned such that the enlarging lens 12 projects the first frame 20 to record the corresponding images K, K', K" at one extreme of the first of the four segments, A, A', A", respectively. The lamp housing 34 is turned on, and a first stepping motor 37, connected to the projector housing 10 moves the projector housing 10 and the film strip carrier 14 synchronously toward the right to fill up the entire segment A. The segment may be scanned continuously or in steps.

During the scanning operation of segment A, the lamp house assembly 34 is moved to the right by a constant speed motor 38, but at a slower speed than the speed of the stepper motor 36. Accordingly, the light cone moves a distance through the scanning cycle which is less than the distance of movement of the light gate 28 and negative 20. In order to assure that the light cone 36 covers the light gate 28 throughout the entire scanning cycle, the light cone width $d_L$, is a selected amount larger than the width $d_g$ of the light gate. The width $d_L$ of the light cone 36 is determined in the manner described below.

Figure 2:
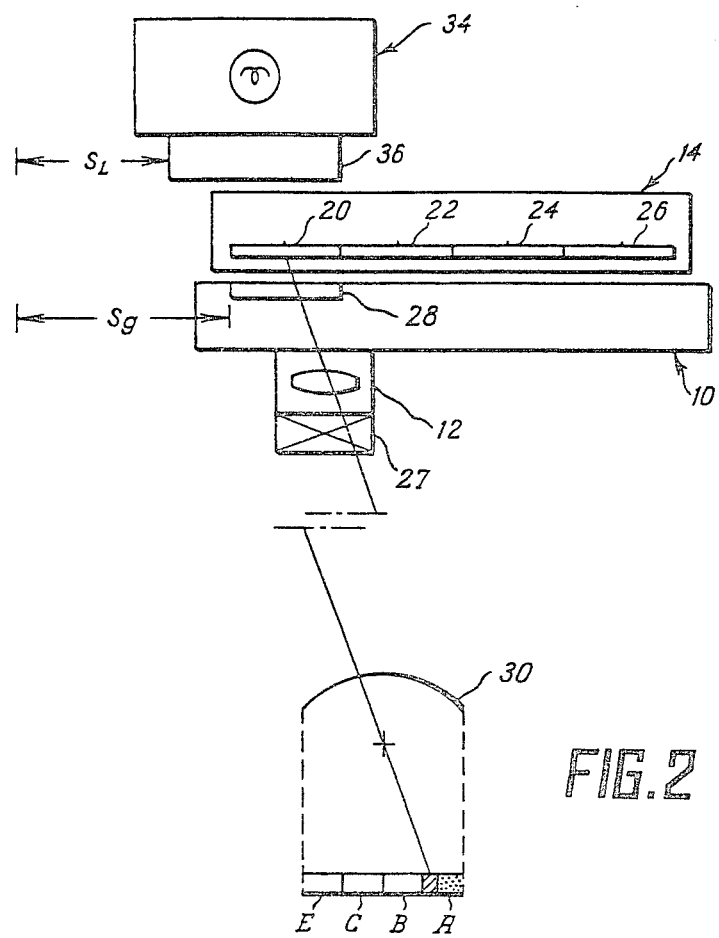
FIGS. 2-3 portray the composing system shown in FIG. 1 at successive stages of operation.
Figure 3:
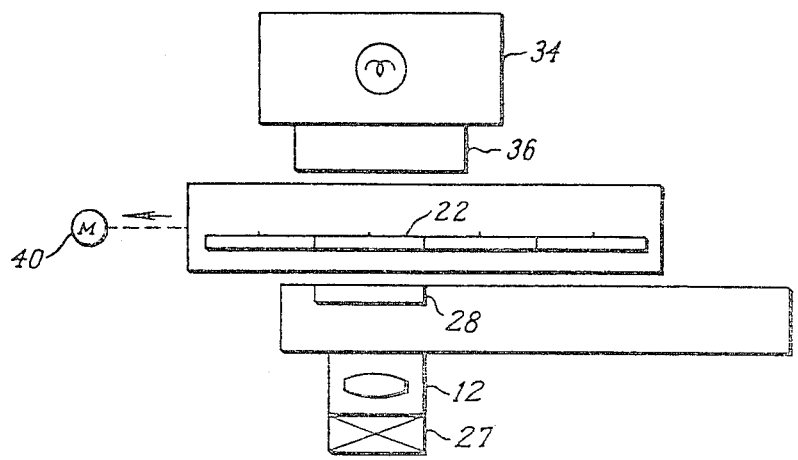

When the apparatus has reached the position shown in FIG. 2, the segment A has been completely scanned and the lamp is turned off. At this time, a second stepper motor 40, coupled to the film strip carrier 14, shifts the of the position film strip carrier 14 relative to the now stationary projector housing 10, to move the second negative 22 in the film strip series into position, in front of the light gate 28, as shown in FIG. 3. When the second film negative 22 is positioned in front of the light gate 28, the film negative carrier 14 is adjusted to perform a key-subject alignment, for example as described in commonly owned U.S. Pat. No. 3,953,869.

During the time it takes to move the second film negative 22 into position in front of the light gate 28 and to perform the key-subject alignment, the constant speed motor 38 continues to move the lamp house assembly 34 in the direction of scanning. Accordingly, by the time that key-subject alignment is completed with respect to the second negative 22, the lamp house assembly 34 has moved relative to the stationary light gate 28, from the position shown in FIG. 2 to the position shown in FIG. 3, wherein again the light cone 36 is positioned, relative to the light gate 28, in the starting position shown in FIG. 1. At this time, the light source is again turned on and scanning of the second negative 22 onto segment B is initiated. This procedure is continued until the entire image band below the lenticules, e.g. image band made up of segments A, B, C and E, is filled in.

As mentioned above, even though the projector housing 10 stops and re-starts a number of times for scanning multiple frame exposures, the lamp housing 34 moves continuously, without stopping during the printing cycle. Since the movement of the lamp housing 34 and that of the negative (light gate 28) are not synchronous during the scanning operation for each negative (since the lamp housing speed is slower than the scanning speed), the light cone 36 has to be long enough to cover the negative during scanning for adequate lighting.

For a particular composing apparatus, the light gate has a width $d_g$ which normally corresponds approximately to the width of the negative. The stepping motor 37 moves the projection lens 12, film strip carrier 14 and light gate at a scanning speed of $v_g$ during scanning of each segment A, B, C and D. During one printing cycle, the light gate 28 and negative travel a distance $S_g$ for each frame exposure (FIG. 2). From these characteristics of the composer, the time $t_n$ required for the scanning operation for each negative can be determined as follows:

$$t_n = S_g/v_g \qquad (1)$$

Between two successive exposures, the negative carrier has to pause for $t_p$ in order to advance the next frame into the light gate and perform the key-subject alignment. From these known parameters which are characteristic of the operation of the projector apparatus, the width of the light cone $d_L$ and the velocity of the lamp housing $v_L$ may be determined to provide a continuously moving lamp housing 34 with a light cone 36 of minimum width.

Assuming that the lamp house and negative start moving at the same time, then in order for the light cone 36 to cover the light gate 28 during the scanning operation of a particular negative:

$$d_L + S_L = d_g + S_g \qquad (2)$$

where $S_L = V_L \times t_n$

While the negative carrier stops for $t_p$, the lamp house overtakes a distance of $d_L - d_g$ to return to the same starting position relative to the light gate 28 and ready for a new scanning cycle. Thus, $$d_L - d_g = v_L \times t_p \qquad (4)$$

By solving the foregoing equations, we can determine that $$v_L = S_g/(t_p + t_n) \qquad (5)$$

$$d_L = (S_g t_p/t_n + t_p) + d_g \qquad (6)$$

Accordingly, by constructing the lamp housing 34 to have a lamp cone width of $d_L$, and driving the lamp housing 34 at a speed $v_L$, the lamp cone 36, moving more slowly than the light gate, will just continue to cover the light gate at the end of the scanning cycle for each of the segments A, B, C and D, and during the pause $t_p$, will overtake the light gate 28 to ready for scanning the next segment.

The foregoing represents a description of a preferred embodiment of the invention. Variations and modifications of the invention will be apparent to persons skilled in the art without departing from the inventive concept disclosed herein. For example, while the projection apparatus was shown and described as containing a four negative series, the negative series may contain additional or fewer negatives, as desired. All such modifications and variations are intended to be within the scope of the invention as defined in the following claims.

I claim:

1. In apparatus for composing a stereoscopic picture of the type including a multiplicity of image bands, each of said image bands comprising a plurality N of condensed image segments from a corresponding plurality N of two-dimensional views of an object field taken from spaced vantage points, and a lenticular screen having a corresponding multiplicity of lenticules aligned with the image bands, said apparatus comprising a projecting lens with a light gate in registry therewith, film holder means for positioning sequentially negatives in a negative film strip series, containing said N two-dimensional views, in said light gate, drive means for moving said lens, at a first preselected speed, in a direction for projecting respective negatives from a corresponding plurality N of projecting lens locations, with the projected image of a selected element of each negative in substantial registry with a reference point, and for stopping said lens at each said lens location for positioning a successive negative in said series in said light gate, and illuminating means for exposing, at each lens location, the respective negative in said light gate for projecting the negative onto a segment of an image band of lenticular print film, the improvement wherein said illuminating means comprises a light cone for directing light through a negative in said light gate and said lens onto said print film, and means for moving said light cone in said direction continuously at a second preselected speed through sequential projecting of all the negatives in said series for illuminating each negative during projection onto its respective segment, wherein said second preselected speed is determined, and said light cone has a width in said direction that is determined, as a function of the operating characteristics of the printer.

2. The improvement as defined in claim 1, wherein said drive means is arranged to move said lens at said first preselected speed for scanning each negative onto its respective segment of film, wherein said second preselected speed is slower than said first preselected speed, wherein said light cone has a width in said direction larger than said light gate and may be moved between first and second positions relative to said light gate in which in each said position said light cone just covers said light gate, wherein the means for moving said light cone include means for positioning said light cone in said first position at the beginning of scanning the first negative of said series, and wherein said preselected second speed is such that at the end of scanning of the last negative in said series said light source is in said second position.

3. The improvement as defined in claim 2, wherein said second predetermined speed and said light cone width are selected such that said light cone moves between said first and second positions relative to said light gate during scanning of each negative, and moves from said second position to said first position relative to said light gate during the time said lens is stopped and the next negative is moved into said light gate.

4. The improvement in accordance with claims 1, 2 or 3, comprising a projector housing for supporting said lens, wherein said illuminating means comprises a lamp housing, wherein said scanning means comprises a stepping motor coupled to said projector housing, and wherein the means for moving said light cone comprises a constant speed motor coupled to said lamp housing.

5. The improvement in accordance with claim 3, wherein said lens travels a distance $S_g$ between successive projecting lens locations, the time for said lens to travel between successive lens locations is $t_n$, said drive means stops said lens for a time $t_p$ at each lens location, and said light gate has a width $d_g$, and wherein said second preselected speed $v_L$ and said light cone width $d_L$ are determined as follows:

$$v_L = S_g/(t_p + t_n)$$

$$d_L = (S_g t_p / t_n + t_p) + d_g$$

6. In a method for composing stereoscopic pictures from a negative film strip series containing a plurality N of two-dimensional views of an object field taken from spaced vantage points, comprising the steps of:

positioning a first negative of said film strip series in a light gate having a projecting lens in registry therewith;

moving said lens, at a preselected first speed, in a direction for projecting respective negatives from a corresponding plurality N of projecting lens locations, with the projected image of a selected element of each negative in substantial registry with a reference point;

stopping said lens at each said lens location and positioning a successive negative in said series in said light gate; and moving a light source with said light gate for projecting the respective negative at each lens location through said lens onto a segment of lenticular print film; the improvement comprising moving said light source in said direction continuously at a preselected second speed through sequential projecting of all the negatives in said series for illuminating each negative during projection onto its respective segment, and directing light from said light source to said light gate through a light cone having a width in said direction that is determined, along with said preselected second speed, as a function of the operating characteristics of the printer.

7. A method as defined in claim 6, wherein said preselected second speed is slower than said preselected first speed, wherein said light cone has a width in said direction larger than said light gate and may be moved between first and second positions relative to said light gate in which in each said position said light cone just covers said light gate, wherein said light cone is positioned in said first position at the beginning of scanning the first negative of said series, and wherein said preselected second speed is such that at the end of scanning of the last negative in said series said light source is in said second position.

8. A method as defined in claim 7, wherein said second predetermined speed and said light cone width are selected such that said light cone moves between said first and second positions relative to said light gate during scanning of each negative, and moves from said second position to said first position relative to said light gate during the time said lens is stopped and the next negative is moved into said light gate.

9. A method in accordance with claim 8, wherein said lens travels a distance $S_g$ between successive projecting lens locations, the time for said lens to travel between successive lens locations is $t_n$, said lens is stopped for a time $t_p$ at each lens location, and said light gate has a width $d_g$, and wherein said second preselected speed $v_L$ and said light cone width $d_L$ are determined as follows:

$$v_L = S_g/(t_p + t_n)$$

$$d_L = (S_g t_p / t_n + t_p) + d_g$$

* * * * *